United States Patent Office 3,788,960
Patented Jan. 29, 1974

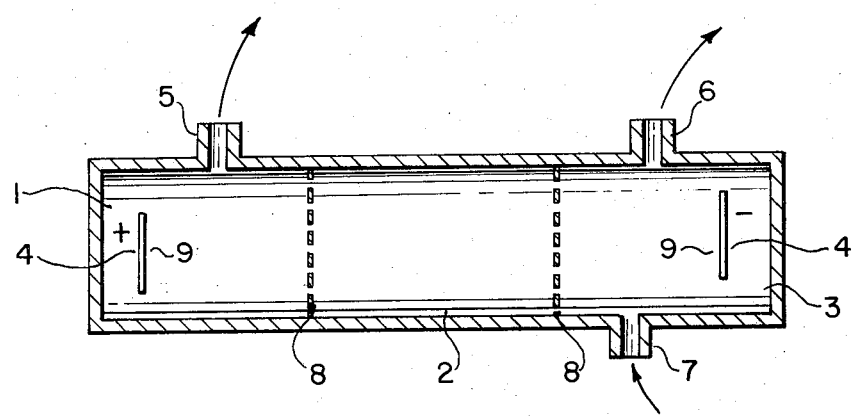

3,788,960
RECYCLING OF ION EXCHANGE
REGENERANT CHEMICALS
Arvind S. Patil, Columbia, Md., and John Jacob Singer, Jr., Hollis, N.H., assignors to W. R. Grace & Co., New York, N.Y.
Filed Feb. 16, 1973, Ser. No. 333,417
Int. Cl. B01d 13/02; C01f 11/14
U.S. Cl. 204—180 P
6 Claims

ABSTRACT OF THE DISCLOSURE

A method of recycling ion exchange regenerant chemicals which comprises electrolyzing the regenerant chemicals in a three-compartment cell in a manner such that the calcium, magnesium, and other impurity metal ions are precipitated and can be removed. The resulting sodium chloride solution is then recycled into the system.

BACKGROUND OF THE INVENTION

It is common practice to utilize beds of cation exchange resins to soften water for household and industrial purposes. These beds or columns of resins are exhausted when most of the resin has been converted from the sodium form to the alkaline earth form, usually the calcium or magnesium form. The beds or columns are regenerated with a solution of a sodium salt, usually sodium chloride because it is a cheap and readily available source of sodium ions. This regeneration procedure yields a large volume of an effluent containing not only calcium and magnesium ions but also residual sodium ions since the regeneration solution must contain an excess of sodium ions to drive the reaction into the desired direction.

The disposition of the resulting regeneration effluent poses a serious problem, particularly because of its content of sodium and chloride ions. The present emphasis on water purity precludes disposition of these solutions as waste solutions.

Various investigators have suggested methods of regenerating this sodium chloride effluent so that it can be used for regenerating another batch of spent ion exchange material. These processes yield a water insoluble residue containing mostly calcium and magnesium salts, which offer no problem in disposal. U.S. Pat. No. 3,528,912, issued Sept. 15, 1970, discloses a system of this type in which the effluent is mixed with sodium carbonate under carefully controlled conditions and the alkaline earth metals are converted to insoluble compounds that are separated by filtration.

BRIEF STATEMENT OF THE INVENTION

We have found that calcium, magnesium, iron, manganese, and other impurities can be removed from the sodium chloride regeneration solution and the solution re-used to regenerate additional ion exchange resin columns. Our process is carried out in a three-chambered electrolytic cell separated by cationic exchange membranes. A sodium carbonate sodium bicarbonate solution is maintained in the anode compartment of the cell and is transported through the cation exchange membranes into the central chamber. The calcium, magnesium and other salts are removed as precipitated from the cathode compartment of the cell. The sodium chloride is passed into the regenerant reservoir for recycling through the ion exchange resin bed or column.

DETAILED DESCRIPTION OF THE INVENTION

Our process depends on the electrolysis of a solution of regenerant chemicals to separate out the undesirable impurities such as calcium, magnesium, iron, and manganese from the solution. The electrolytic cell consists of three compartments. The cathode chamber, the anode chamber and the central compartment. Although the central compartment is desirable it is not necessary for operation of our process.

The anode and cathode compartments are divided from the central compartment by cation exchange membranes having cation exchange transfer even at high salt concentrations. Several of these membranes are commercially available. An example of a suitable membrane is the membrane identified commercially as Ionic 61 DY9-067. This membrane is characterized by having high cation transfer even at high salt concentrations. These cation exchange membranes prevent transport of the chloride ion during electrolysis to another chamber which may lead to production of objectionable chlorine gas therein.

The reactions that take place at the cathode during the passage of current through the cell can be viewed as:

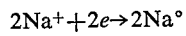

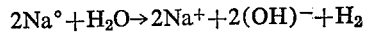

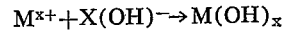

where $e$ denotes electrons and M can be any or all of the alkaline earth metals or other metal ions either naturally present or introduced as impurities such as iron or manganese for example and $x$ is the valence of the metal ion M.

In operation of the cell a sodium carbonate-sodium bicarbonate mixture is added to the anode compartment. The reaction at the anode during the passage of current depends on relative proportions of sodium carbonate and sodium bicarbonate salt present. If the salt is sodium carbonate alone the reaction is as follows:

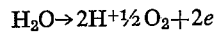

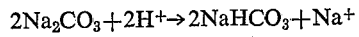

The sodium ions produced are transferred to the cathode chamber conducting the current as well as maintaining electroneutrality by combining with the chloride ions left behind after precipitation with metal or other metal ions. If the salt in the anode chamber was sodium bicarbonate alone then the reaction is:

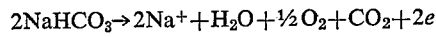

The $CO_2$ produced in this reaction is necessary because of the solubility of calcium hydroxide precipitate in the cathode chamber which gives the regenerant brine solution a pH slightly above 11. It has been found that bubbling the $CO_2$ gas into the solution brings the pH of the solution to near neutrality. By adjusting the relative proportion of carbonate and bicarbonate salts, it is possible to produce the requisite amount of carbon dioxide.

One embodiment of the cell used in our novel process is shown in the drawing in which the inner compartment 1 is equipped with an electrode 9 connected to a source of electricity 4 not shown. The anode compartment as separated from the central compartment 2 by two semipermeable membranes. The cathode compartment 3 is also equipped with an electrode 9 and is connected to a source of electricity 4. Aperture 5 in the anode compartment is designed to remove carbon dioxide formed in this compartment. The cathode compartment is equipped with apertures 6 and 7 for bringing the regenerant solution into the compartment at 7 and moving the sodium chloride solution to the regenerant reservoir through the aperture 6.

In operation the anode compartment is filled with sodium carbonate or a sodium carbonate-sodium bicarbonate mixture. This solution serves two functions. It provides sodium for reaction with the chloride ions to reform sodium chloride and provides carbon dioxide for circulation to the regenerant reservoir to adjust the pH of the regenerant brine solution to pH 7.

The sodium carbonate-sodium bicarbonate solution is fed as needed to the anode compartment to maintain the concentration of salts at about 25 to 2500 grams per liter, preferably 750 to 1500 grams per liter. When both sodium carbonate and sodium bicarbonate are present the ratio of sodium carbonate to sodium bicarbonate is maintained at about 1 to 1.

The calcium and magnesium salts are precipitated in the cathode compartment and may be removed continuously through a filtration system or may be removed intermittently from the cell. The regenerant solution contaminated with calcium, magnesium, iron, manganese, etc., is fed continuously into the cathode compartment at a rate of about 5 to 10 liters per minute and the regenerated sodium chloride solution is removed at about the same rate to the regenerant reservoir. The cell is operated at a current density of about 0.1 amp./cm.$^2$.

Our novel process has several attractive features over the processes of the prior art. These features include:

(1) Because of the ability to recycle the regenerant chemicals, major savings are possible, apart from the significant pollution abatement.

(2) This method of precipitating Ca/Mg, as well as other metal ions, is simple and cheap to operate since electrochemical efficiencies of over 90% are possible. The various gases such as hydrogen, oxygen and carbon dioxide are vented as a mixture and do not pose any serious fire or health hazard, under normal operating conditions.

(3) There is no precipitation of hardness-causing ions (Ca/Mg) within the ion exchange column.

(4) There is no accumulation of metal ions such as manganese or iron in the regenerant pool since these and other impurity metal ion are precipated along with the main hardness-causing Ca/Mg ions.

(5) This can be a closed cycle operation, except for the period replenishment of salt and can be made to operate automatically.

Our invention is further illustrated by the following specific, but nonlimiting examples:

EXAMPLE 1

An electrolytic cell similar to the one shown in the drawing was set up. A total of 100 ml. sodium chloride solution containing calcium chloride was added to the cathode compartment. The concentration of the sodium chloride was about 4 normal and the concentration of calcium ion was adjusted so that for every part of calcium there were 32 parts of sodium chloride. The calcium content of the 100 ml. solution was determined by ethylenediamine-tetracetic acid (EDTA) titration and was found to be 0.29 gm. of calcium. A 2 molar solution of sodium chloride was added to the central and anode chambers. The solution in the cathode chamber was not recirculated and instead fresh 100 ml. solution of sodium chloride containing calcium chloride was added over 24 minutes. After the solution and reaction products of the previous 24 minute run were drained, the solution of sodium carbonate contained in the anode and central compartments was kept constant. During every run of 24 minute duration 2 amp. current were passed through the cell. The cathode solution in each case was analyzed by standard EDTA titration. After 96 minutes of operation, the solution in the anode compartment was at pH of 9.35 and the cathode compartment at a pH of 11.2 and the center compartment had a pH of 10.9. The cathode solution contained a white precipitate of calcium hydroxide as determined by X-ray diffraction. After bubbling $CO_2$ through the solution, the pH dropped to 6.0. The results of this run are shown in the Table 1.

TABLE 1

|  | Percent calcium removed | Current efficiency in percent |
| --- | --- | --- |
| Time in minutes: | | |
| 24 | 74 | 91 |
| 48 | 83 | 100 |
| 72 | 83 | 100 |
| 96 | 80 | 99 |

EXAMPLE 2

In this example electrolysis of a solution with the same concentration as carried out and the same equipment as in Example 1, except that a 10% solution of sodium bicarbonate was substituted for the sodium carbonate in the anode and center chambers. After passing a current, or two amps., for 24 minutes, 75% of the calcium was removed from the solution with a current efficiency of 92%. A volume of carbon dioxide gas was produced by the reaction in the anode compartment.

EXAMPLE 3

In this example, electrolysis was carried out under conditions described in Example 1 except that a mixture of sodium bicarbonate and sodium carbonate was used in both the anode and the central chambers. The volume of carbon dioxide produced was reduced without reduction in the calcium removal with a current efficiency of 80–99%.

EXAMPLE 4

In this example run the system was scaled up from 100 ml. of 5 liters.

A 5-liter solution simulating regenerant brine, of 1 kg. ion exchange capacity, was prepared by taking 934.4 grams of sodium chloride and 98.3 grams of calcium chloride ($CaCl_2$) to give a salt to calcium ratio of 35:1. In addition to the 5-liter solution, 450 milligrams of manganeous dichloride tetrahydrate and 364 milligrams of ferrous dichloride dihydrate were added to give 25 parts per million of manganous and ferrous ion concentration.

The five-liter solution was circulated through the cathode chamber while 2 amp current was passed through the system for a period of 18.6 hours. The anode and middle chamber contained 110 grams of sodium bicarbonate as described in Example 4 and the $CO_2$ produced in the anode compartment was bubbled through the brine solution reservoir. At the end of the experiment calcium and magnesium was completely removed from the solution through precipitation. Colorimetric analysis for ferrous ion and manganous ion showed that these ions could not be detected.

What is claimed is:

1. An electrochemical method for regenerating a cation exchange material in the alkaline earth metal form which comprises the steps of:
   (a) flowing an aqueous regenerating liquid containing sodium through a bed of cation exchange material in the alkaline earth form,
   (b) collecting the effluent liquor containing dissolved alkaline earth metal ions,
   (c) feeding said effluent liquor to the cathode compartment of an electrolytic cell,
   (d) feeding a solution of sodium carbonate to the anode compartment of said cell,
   (e) passing a current through said cell while maintaining the pH of the solution in the cathode compartment at about 7 by bubbling the carbon dioxide gas evolved at the anode into said cathode compartment,
   (f) recovering the insoluble alkaline earth metal hydroxides and precipitated salts formed from the cathode compartment and,
   (g) recirculating the regenerated sodium containing liquid through the bed of cation exchange material.

2. The process according to claim 1 wherein the cell is operated at a current density of 0.001 to 100 amperes/cm.$^2$.

3. The process according to claim 1 wherein a mixture of sodium carbonate and sodium bicarbonate is fed continuously to the anode compartment of said electrolytic cell.

4. The process according to claim 3 wherein the sodium carbonate-bicarbonate solution is maintained at a concentration of 25' to 100 weight percent for each kilogram of regenerated capacity.

5. The process according to claim 1 wherein the electrolysis is carried out in a three-compartment cell.

6. The process according to claim 1 wherein the cell compartments are separated by ion exchange resin membranes.

References Cited
UNITED STATES PATENTS

| | | | |
|---|---|---|---|
| 2,057,232 | 10/1936 | Endell | 204—180 B |
| 2,812,300 | 11/1957 | Pearson | 204—151 |
| 3,466,139 | 9/1969 | Mihara et al. | 204—180 BX |
| 3,547,810 | 12/1970 | Cooper | 210—62 |

JOHN H. MACK, Primary Examiner
A. C. PRESCOTT, Assistant Examiner

U.S. Cl. X.R.

204—100, 180 B; 210—24, 62